United States Patent

Feldmann et al.

Patent Number: 4,475,632
Date of Patent: Oct. 9, 1984

[54] DISC BRAKE HAVING WEAR COMPENSATING MECHANISM

[75] Inventors: Joachim Feldmann, Neustadt; Otto Friederichs, Garbsen, both of Fed. Rep. of Germany

[73] Assignee: WABCO Fahrzeugbremsen GmbH, Hanover, Fed. Rep. of Germany

[21] Appl. No.: 464,548

[22] Filed: Feb. 7, 1983

[30] Foreign Application Priority Data

Feb. 6, 1982 [DE] Fed. Rep. of Germany ....... 3204188

[51] Int. Cl.³ ...................... F16D 65/20; F16D 65/52
[52] U.S. Cl. .................................. 188/71.4; 188/71.8; 188/72.3; 188/72.4; 188/196 P
[58] Field of Search ............ 188/71.3, 71.4, 71.5, 188/71.8, 71.9, 72.3, 72.4, 72.5, 73.2, 196 A, 196 R, 196 P, 199, 216, 366, 367, 368, 369, 370; 192/111 A; 277/164

[56] References Cited

U.S. PATENT DOCUMENTS

| | | | |
|---|---|---|---|
| 3,124,216 | 3/1964 | Buyze | 188/71.4 |
| 3,421,604 | 1/1969 | Hobbs | 188/196 P X |
| 3,952,841 | 4/1976 | Pringle | 188/71.8 |
| 4,024,931 | 5/1977 | Klaue | 188/71.4 X |
| 4,026,391 | 5/1977 | Reinecke | 188/71.9 |
| 4,054,189 | 10/1977 | Klaue | 188/71.4 |
| 4,096,926 | 6/1978 | Klaue | 188/366 X |
| 4,381,047 | 4/1983 | Gregoire et al. | 188/196 P X |

*Primary Examiner*—Douglas C. Butler
*Attorney, Agent, or Firm*—G. J. Falce

[57] ABSTRACT

A disc brake having a brake shoe wear compensating mechanism in which the sealing gaskets for the operating chamber formed between a pair of spreading members are arranged to be elastically deformable during a brake application, so as to exert a return force during a brake release. A joining element is provided between the spreading members, which utilizes a spring and the friction connection between the joining element and one of the spreading members to exert a return force independently of the return force exerted by the sealing gaskets, to thereby assure a sufficient brake release stroke.

7 Claims, 4 Drawing Figures

DISC BRAKE HAVING WEAR COMPENSATING MECHANISM

BACKGROUND OF THE INVENTION

The invention relates to actuating apparatus for disc brakes in which elastic sealing elements between the relatively movable spreading members of the actuating apparatus serve the additional function of providing a return force on the spreading members during a brake release.

The return of the spreading elements after a braking action takes place in known actuating apparatus is by means of specially-designed elastomeric seal rings which fulfill two functions, namely the sealing function of the pressure chambers, and the return function after application of the brake.

On fully-lined disc brakes, these two functions may overstress the elastic ring elements on account of the large seal diameter, so that problems can occur in the brake, such as insufficient return of the spreader elements, since the return distance is a function of the elasticity of the ring elements. This can, especially after an automatic adjustment of the clearance of the actuating apparatus caused by wear of the brake lining, lead to a situation where insufficient return results in insufficient brake shoe clearance.

SUMMARY OF THE INVENTION

The object of the invention, therefore, is to provide actuating apparatus of the type mentioned above in which the seals of the hydraulic chamber are freed from the return function, to thus guarantee, in a simple manner, a sufficient return stroke of the spreader elements.

A joining element located in the region of the spreading movement of the actuating apparatus provides the capability of relieving at least one of the two elastic seal elements of the return function, while the return function is carried out by a spring acting on the joining element, or at least is assisted by it.

The joining element can optionally be installed either on the outside diameter or on the inside diameter or, if a very high return force is required, on the outside and inside diameter of the spreader elements.

The actuating apparatus described by the invention simultaneously and advantageously solves the problem of a clearance adjustment, which occurs automatically on account of wear to the brake lining, whereby after such an adjustment, the complete return of the spreader element is guaranteed.

BRIEF DESCRIPTION OF THE DRAWINGS

The invention is described in more detail below with reference to examples which are illustrated in the drawing.

DESCRIPTION AND OPERATION

Figure 1:
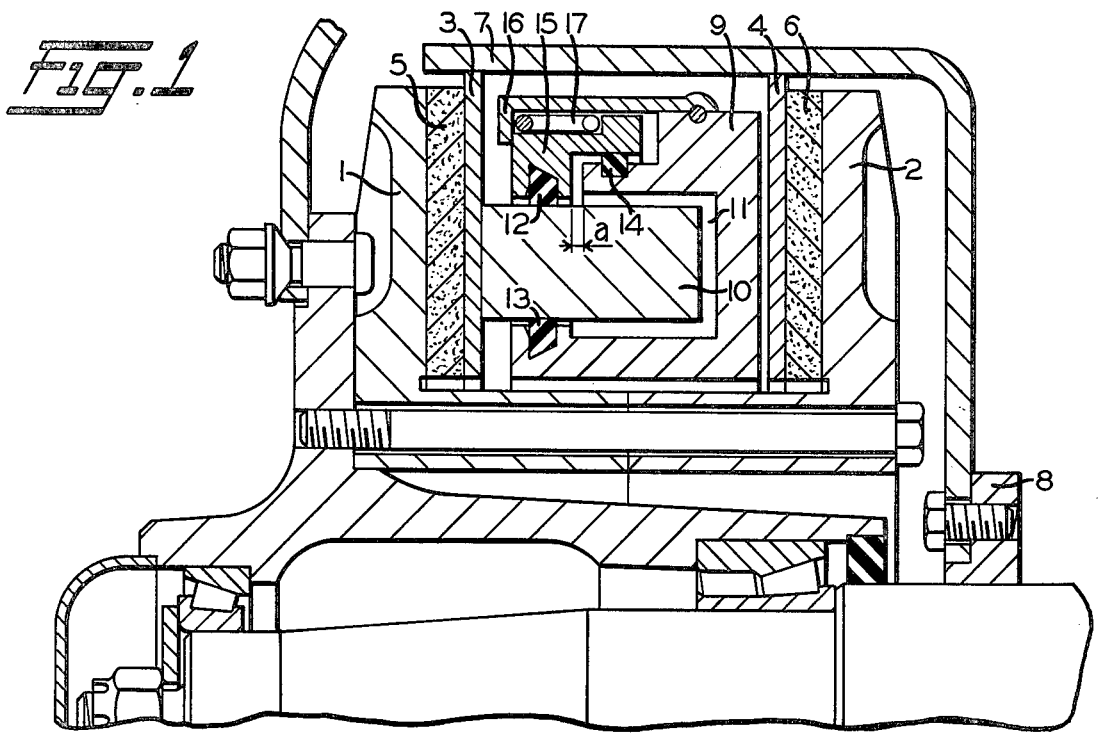
FIG. 1 shows a hydraulic fully-lined disc brake in which the actuating apparatus consists of a cylinder and a piston, with a joining element and return spring on the outside diameter of the appatatus, to provide automatic clearance adjustment.

A housing of a hydraulic fully-lined disc brake, consisting of two brake discs 1 and 2, is fastened by bolts on the hub of a vehicle axle. The fixed parts of the brake consist of annular brake plates 3 and 4 having brake shoes 5 and 6 fastened to them, which are frictionally-engaged during braking with the rotating brake discs 1 and 2. The brake shoes are mounted on a brake anchor plate 7, which is fastened to the axle flange 8, so that they are fixed in the rotational direction, but can move freely in the axial direction.

The actuating apparatus for the hydraulic brake consists of two annular spreader elements 9 and 10, which are configured as a U-shaped annular cylinder 9 and an annular piston 10. The piston 10, which is guided in the U-shaped profile of cylinder 9 forms an annular hydraulic chamber 11, which is sealed on the inside and outside diameter by means of annular elastic elements 12, 13 and 14.

The outer leg of the U-shaped cylinder 9 is shortened and configured so that an annular chamber is formed on the outside diameter of the actuating apparatus. A loose joining element 15 operates in this chamber and establishes an indirect axial operating connection between piston 10 and cylinder 9, in which the elastic element 12 provides a seal between piston 10 and joining element 15, the elastic element 14 provides a seal between joining element 15 and cylinder 9, while the elastic element 13 forms a direct seal between the inner leg of the U-shaped cylinder 9 and piston 10. In the example illustrated here, the elastic element 13 also fulfills the brake return functions on the inside diameter of the actuating apparatus. This additional function, however, is negligible. The joining element 15 has a play "a" in the stroke movement direction of the spreader elements 9 and 10, which corresponds to the maximum clearance of the actuating apparatus during braking. A stop 16 on the cylinder 9 limits axial movement of the joining element 15 jointly with piston 10 in the spreading or brake application direction. The stop 16 simultaneously serves as a support for a return spring 17, which places tension on the joining element 15 in the return or brake release direction.

Figure 2:
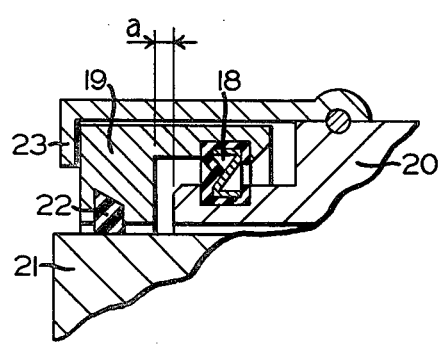
FIG. 2 shows actuating apparatus as shown in FIG. 1, the return spring of which is combined with an elastic ring element.
Figure 3:
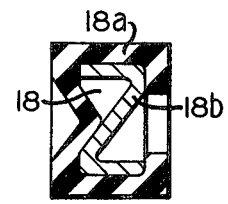
FIG. 3 shows the elastic ring element combined with a spring as shown in FIG. 2.

As shown in FIG. 2, the return spring is replaced by an elastic combination ring element 18, which is installed in place of the elastic ring element 14 shown in FIG. 1. The elastic ring element 18 consists of an elastomer 18a to seal off the hydraulic chamber, and a steel spring element 18b embedded in it, as shown in FIG. 3. While in FIG. 1, the elastic ring element 14 permits the axial movement of the joining element 15 by means of the sealing friction connection between the ring cylinder 9 and the joining element 15, as shown in FIG. 2, the elasticity of the elastic ring element 18 anchored in undercuts of the ring cylinder 20 and the joining element 19 makes possible the axial movement of the joining element 19, so that the steel spring element 18b, which is deformed when the spreading motion takes place, causes the return.

Figure 4:
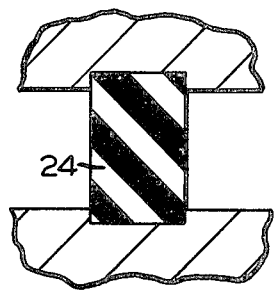
FIG. 4 shows a ring element consisting of pure elastomers as an alternative to the ring element shown in FIG. 3.

The elastic ring element 18 shown in FIG. 3 can, on the other hand, also consist of an elastic ring element 24 formed from a block of pure elastomer, as shown in FIG. 4.

In the functional description below, the clearance adjustment for brake lining wear mentioned above will be explained in more detail.

When the hydraulic chamber 11 is pressurized, the ring piston 10 moves out of the ring cylinder 9 and by reason of the frictional engagement of elastic element 12, carries along with it the joining element 15 against the force of the spring 17, it being understood that the frictional resistance betwee elastic element 12 and piston 10 is greater than the force exerted by spring 17. The elastic element 13 guided in an undercut of the cylinder 9 is elastically deformed by frictional engagement with piston 10. The joint movement of piston 10 and joining element 15 is possible over the stroke distance marked "a", which corresponds to the normal brake lining clearance during braking, until the stop 16 provided for the joining element 15 is engaged. If, as a result of brake lining wear, the spreading movement of piston 10 exceeds this normal stroke distance, then the friction between piston 10 and elastic ring elements 12 and 13 is overcome to permit relative movement between piston 10 and joining element 15 an amount corresponding to the brake lining wear.

When the brakes are released, which results in a decrease of pressure in hydraulic chamber 11, the return of the deformed elastic element 13 to its original shape produces a return force, which is exerted on piston 10. According to the invention, this return force is assisted by the tensile force of spring 17 acting via joining element 15 and the friction connection of the elastic seal element 12 with piston 10. A complete return stroke is thereby guaranteed.

As shown in FIG. 2, the assistance in return force is provided by the elastic combination ring element 18 shown in FIG. 3 by a return of the spring 18b embedded in the elastomer 18a, so that the function of the actuating device consisting of an annular cylinder 20 and an annular piston 21 proceeds in an interaction with the joining element 18, the stop 23 and the elastic element 22 according to the function described in FIG. 1.

A further increase of the return force is conceivable, if the return apparatus described by the invention is installed both on the outside diameter and also on the inside diameter of the actuating apparatus. In such an application, both elastic ring elements 12 and 13 would advantageously have solely sealing and friction functions.

Having now described the invention, what we claim as new and desire to secure by Letters Patent, is:

1. In a disc brake having at least one brake member and at least one disc member with which said brake member is engageable to effect a brake application, actuating apparatus comprising:
   (a) a pair of spreading members cooperatively arranged to form a chamber therebetween;
   (b) a joining element between said pair of spreading members;
   (c) a stop on one of said spreading members to limit the degree of axial movement of said joining element relative to said one of said spreading members;
   (d) a first elastic ring between said joining member and the other spreading member to provide a fluid pressure seal and a friction coupling therebetween, said friction coupling effecting axial displacement of said joining element toward engagement with said stop, when fluid under pressure is supplied to said chamber to actuate said pair of spreading members and thereby force said at least one brake member into engagement with said at least one disc member;
   (e) a second elastic ring between said joining element and said one spreading member to provide a fluid pressure seal for said chamber; and
   (f) resilient means operatively disposed between said joining element and said one spreading member for exerting an axial force on said joining element in a direction away from said stop, so that upon the release of said fluid under pressure from said chamber, said joining element is shifted a predetermined distance away from said stop, whereby said friction coupling between said joining element and said other spreading member is effective to retract said other spreading member in a direction to effect disengagement between said at least one brake member and said at least one disc member and thereby release said brake application.

2. Actuating apparatus as recited in claim 1, further characterized in that said friction coupling is stronger than the force exerted by said resilient means on said joining element, whereby said first elastic ring is deformed when said spreading members are actuated to effect said brake application, the stress of said deformed elastic ring being such as to exert a return force on said spreading members in conjunction with the force exerted by said resilient means to release said brake application when fluid under pressure is released from said chamber.

3. Actuating apparatus as recited in claim 1, wherein said resilient means comprises a spring.

4. Actuating apparatus as recited in claim 1, wherein said second elastic seal ring includes said resilient means.

5. Actuator apparatus as recited in claim 4, wherein said second elastic seal ring is deformable and includes a spring comprising said resilient means embedded therein.

6. Actuator apparatus as recited in claim 4, wherein said second elastic seal ring comprises a solid block of elastomeric material.

7. Actuator apparatus as recited in claim 1, further comprising a third elastic ring between said one and said other of said spreading members to provide a friction connection therebetween and to further provide a seal for said chamber, said third elastic ring being deformable in response to said actuation of said spreading members during said brake application, whereby the tension of said deformation exerts a force on said spreading members in a brake release direction.

* * * * *